United States Patent
Jacon et al.

(10) Patent No.: US 12,319,401 B2
(45) Date of Patent: Jun. 3, 2025

(54) SEALING ARRANGEMENT FOR A ROLLING BEARING SUBJECTED TO CENTRIFUGAL FORCES

(71) Applicant: SAFRAN AIRCRAFT ENGINES, Paris (FR)

(72) Inventors: Bruno Alexandre Didier Jacon, Moissy-cramayel (FR); Cédric Antonio Da Silva, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 4 days.

(21) Appl. No.: 18/559,829

(22) PCT Filed: Jun. 27, 2022

(86) PCT No.: PCT/FR2022/051267
§ 371 (c)(1),
(2) Date: Nov. 9, 2023

(87) PCT Pub. No.: WO2023/275470
PCT Pub. Date: Jan. 5, 2023

(65) Prior Publication Data
US 2024/0270371 A1  Aug. 15, 2024

(30) Foreign Application Priority Data

Jun. 30, 2021 (FR) ....................... 2107066

(51) Int. Cl.
*B64C 11/06* (2006.01)
*F16C 33/78* (2006.01)

(52) U.S. Cl.
CPC .......... *B64C 11/06* (2013.01); *F16C 33/7886* (2013.01); *F16C 2326/43* (2013.01)

(58) Field of Classification Search
CPC .............. F16C 33/7886; F16C 2326/43; F16C 33/7869; F16C 33/78; F16C 33/7816; B64C 11/06; F16J 15/3452; B64D 2027/005
See application file for complete search history.

(56) References Cited

U.S. PATENT DOCUMENTS

| | | | |
|---|---|---|---|
| 2,438,542 A | 3/1948 | Cushman | |
| 4,043,620 A * | 8/1977 | Otto | ..................... F16C 33/7813 384/489 |

(Continued)

FOREIGN PATENT DOCUMENTS

| | | | |
|---|---|---|---|
| DE | 10210008947 A1 * | 8/2010 | .............. F16C 33/76 |
| GB | 550257 A | 12/1942 | |

(Continued)

OTHER PUBLICATIONS

International Search Report and Written Opinion issued Sep. 9, 2022 in PCT/FR2022/051267 filed on Jun. 27, 2022, 15 pages (with English Translation).

(Continued)

*Primary Examiner* — Woody A Lee, Jr.
*Assistant Examiner* — Eric A Lange
(74) *Attorney, Agent, or Firm* — Oblon, McClelland, Maier & Neustadt, L.L.P.

(57) ABSTRACT

A sealing device composed of a lip seal and a spring or another resilient seal which radially and axially compresses the first seal, forming two sealing lines closed over substantially planar surfaces which are opposed in the direction of the protected rolling bearing axis. The device is small and lightweight and withstands the centrifugal forces in the lateral direction of the rolling bearing. It is possible to dispense with any further parts for retaining it. The space requirement is reduced, and assembly is easy. The sealing (Continued)

Figure 1:
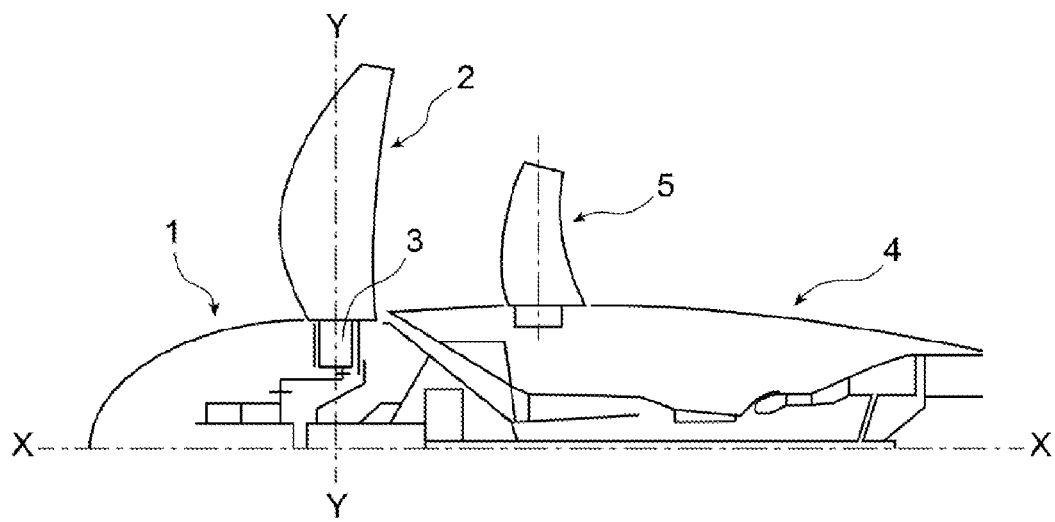

device is suitable for arrangements of variable-pitch propeller blade roots.

15 Claims, 6 Drawing Sheets

(56) References Cited

U.S. PATENT DOCUMENTS

| | | | | |
|---|---|---|---|---|
| 4,618,154 | A | * | 10/1986 | Freudenthal ......... F16J 15/3236 |
| | | | | 277/556 |
| 8,057,184 | B2 | * | 11/2011 | Sebald ................. F16C 19/543 |
| | | | | 384/465 |
| 9,970,480 | B1 | * | 5/2018 | Naser .................... F16C 33/121 |
| 2007/0133915 | A1 | | 6/2007 | Burner et al. |
| 2015/0078899 | A1 | | 3/2015 | Belmonte et al. |
| 2016/0312896 | A1 | * | 10/2016 | Perratone ................ F16C 33/74 |
| 2021/0003173 | A1 | * | 1/2021 | Calatraba ............. F16C 43/065 |

FOREIGN PATENT DOCUMENTS

| | | | |
|---|---|---|---|
| WO | WO 2005/047720 A1 | | 5/2005 |
| WO | WO-2009143972 A1 * | 12/2009 | .............. F16C 33/78 |

OTHER PUBLICATIONS

French Preliminary Search Report and Written Opinion issued Mar. 4, 2022 in French Application 21 07066 filed on Jun. 30, 2021, 9 pages (with English Translation of Categories of Cited Documents).

\* cited by examiner

SEALING ARRANGEMENT FOR A ROLLING BEARING SUBJECTED TO CENTRIFUGAL FORCES

The present invention relates to a sealing arrangement subjected to centrifugal forces.

It relates more precisely to such an arrangement in a mechanical assembly rotating around an axis of rotation (called motor axis), and wherein the rolling bearing has a central axis perpendicular to the axis of rotation (motor axis), so that the rolling bearing is eccentric from the axis of rotation and subjected to centrifugal forces in the direction perpendicular to the axis of rotation. An application particularly considered here, but which is not exclusive of others, is a rolling bearing of an aircraft engine propeller blade root, wherein the blade root pivots to vary the orientation of the blade relative to the longitudinal direction of the engine as desired, which is called the pitch of the blade.

The centrifugal forces exerted on this rolling bearing during the rotation of the propeller are directed along the axis of the blade. A seal must be added to close the rolling bearing housing on the radially outer side and prevent the entry of moisture or polluting particles into the housing, and also to prevent flow of lubricant (regardless of its nature) under the effect of centrifugal forces. The seal, in turn, must be retained against centrifugal forces, and ensure its function despite the significant deformations to which centrifugal forces can subject it.

Various arrangements have been proposed to meet these requirements and isolate the rolling bearing housing from the external environment, but they have various disadvantages, and in general a certain complication which reduces their interest in an application where it is constantly sought to lighten the equipment, and where the free length to accommodate the seal, in the axial direction of the rolling bearing (blade axis) between the rolling bearing and the blade, is reduced.

Sealing is often obtained by compressing the seal between two faces of the arrangement, which are concentric in the radial direction according to the axis of the rolling bearing or the pivot axis of the blade root; these concentric faces can belong to the root of the blade and to the hub wherein the root pivots, or possibly to extensions of the rolling bearing rings. A part such as a nut screwed to the hub must be added to the arrangement to retain the seal against centrifugal forces, which is disadvantageous. Another disadvantage is that the insertion of the seal, which is compressed between the two concentric faces and must be moved along these faces, is tedious regardless of the constitution of the seal.

Document US 2015/0 078 899 A1 describes a sealing device where a nut 7 for mounting the rolling bearing carries a seal 21 to create a first sealing of the housing containing the rolling bearing, and a conical lip 8 on the outside of the housing to deflect lubricant leaks towards the radial outside of the rolling bearing axis.

Document GB 550 257 A describes a device where a nut tightening the rolling bearing in its housing carries a first seal to establish the sealing of the housing, and a second seal to establish a sealing around the root of the blade.

Document U.S. Pat. No. 2,438,542 A is characteristic of one of the designs described above, a seal of a rolling bearing housing being radially compressed (according to the axis of the rolling bearing) between the tightening nut of the rolling bearing and the root of the blade.

An object of the invention is to overcome these inadequacies and to propose a sealing arrangement, adapted to this technical context, which is at the same time reliable, lightweight and little bulky.

According to a general definition, the invention relates to a mechanical assembly rotating around an axis of rotation (motor axis) and comprising a rolling bearing, two parts for respectively mounting two rings of the rolling bearing, the mounting parts forming a housing receiving the rolling bearing, one of the rings of the rolling bearing rotating around a central axis of the rolling bearing which is perpendicular to the axis of rotation, and comprising a device for sealing the housing on a radially outer side according to the axis of rotation, characterised in that the sealing device comprises:

- a first sealing element comprising an annular strip (called "heel") and a first lip which is essentially planar or conical and connected to a portion, located radially outside according to the axis of rotation, of the annular strip;
- a second sealing element adjacent to the annular strip and to the first lip, pressing the first lip radially outwards according to the axis of rotation (motor axis or axially according to the axis of the rolling bearing or blade root axis), against a part of the assembly integral with a second of the rings;
- and a sealing portion pressing on a lateral end face of the first of the rings.

Important original aspects of the invention are therefore that sealing portions or lines are created on surfaces of essentially axial orientation according to the central axis of the rolling bearing, without a sealing line on a surface of radial orientation is necessary. The sealing device can be easily inserted into the rolling bearing housing, because its width in the radial direction is advantageously smaller than the radial distance (according to the central axis) between the two mounting parts, which delimit the housing of the rolling bearing: the insertion therefore takes place with some clearance. The sealing device is easy to tighten in the direction of the central axis. It is not very sensitive to the risk of tearing produced by centrifugal forces, thanks to its orientation and its lightness. The second sealing element has the function of maintaining the sealing lines thanks to its compression in the axial direction according to the central axis (rolling bearing axis). And the arrangement can be achieved without having to add a part which would only serve to tighten or maintain the device, which rests on one of the rings of the rolling bearing, and whose first lip will often be pressed by a part of the arrangement already present for another reason in conventional arrangements.

The first sealing element is advantageously a flexible seal, that is to say it deforms much more than the surrounding parts, which are generally metallic, when a force is applied thereto, for example when mounting the assembly. It is preferably made of polymer.

The annular strip of the first sealing element is advantageously separated from a wall of the housing, oriented in the direction of the central axis, by a clearance at least in a free state of the first sealing element. It is then possible to insert it into the housing without deforming it, and therefore with ease.

The second sealing element is then advantageously capable of exerting a deformation, oriented towards said wall of the housing, of said annular strip, which allows it to adhere to the wall and to block the position of the first element. However, it is unnecessary to obtain additional sealing by this contact, the sealing of the housing being already ensured by the two sealing portions mentioned.

The second sealing element is also advantageously flexible, and more precisely made of a resilient material, which allows it to exert the sealing force on the two portions when it has been compressed, and possibly to exert a force of pushing the annular strip onto the opposite wall. It is a spring in certain embodiments, a seal in others.

According to an important embodiment, the sealing portion is a second essentially planar or conical lip of the first sealing element, and the second sealing element is a spring.

It is then advantageous for the spring to comprise two branches pressing respectively on free ends, opposite the annular strip, of the first lip and the second lip, and a connecting portion of the branches pressing on the annular strip, the branches forming an angle opening from the connecting portion; or to have a closed, circular or elliptical section.

But according to another important embodiment which is also advantageous, the sealing portion belongs to the second sealing element, which is a resilient seal with a deformable section.

The first of the rings can be both the inner ring and the outer rolling bearing ring; the second possibility is however particularly considered.

The invention can equip almost any rolling bearing model, and for example angular contact rolling bearings offering both radial support and axial support; an embodiment to be noted then includes the first of the rings offset radially inwards, according to the axis of rotation, relative to the second of the rings; the sealing device is then often small enough so as not, or almost not, to project beyond the rolling bearing, and therefore not require any increase in the size of the device.

The part associated with the second ring can also be in different shapes; it can for example be a collar made integrally with the second of the rings, or a nut for tightening the second of the rings on a second of the mounting parts.

A retaining ring covering the annular strip, radially outwards according to the axis of rotation, can be added to the arrangement if centrifugal forces are likely to tear the device from its housing, despite its lightness.

Rotation stop pins of the first sealing element, which penetrate into pairs of notches extending from the annular strip and the first of the mounting parts, can also be added to maintain the first sealing element at an immutable angular position relative to this first mounting part.

According to another advantageous arrangement, the part associated with the second of the rings comprises a wear track in contact with the first lip.

And according to a particularly considered embodiment, the mechanical assembly is a propeller rotor with variable-pitch blades, one of the rolling bearing rings is mounted on a root, pivoting in the rotor, of one of the blades, the other of the rings is mounted in a hub of the rotor.

Figure 2:
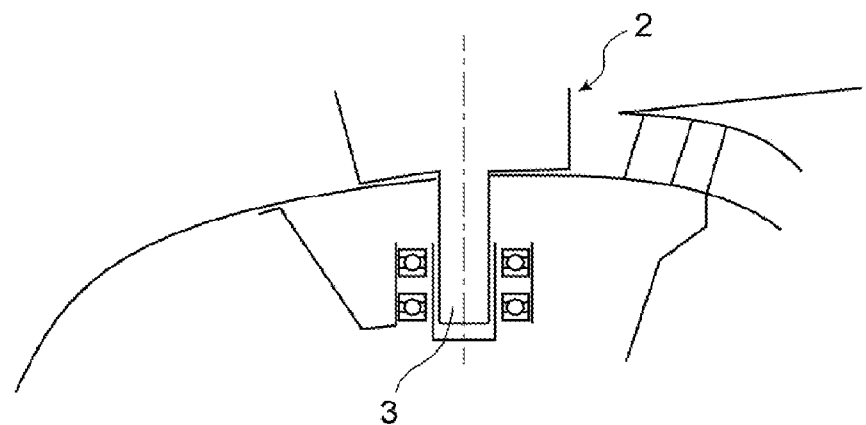
Figure 3:
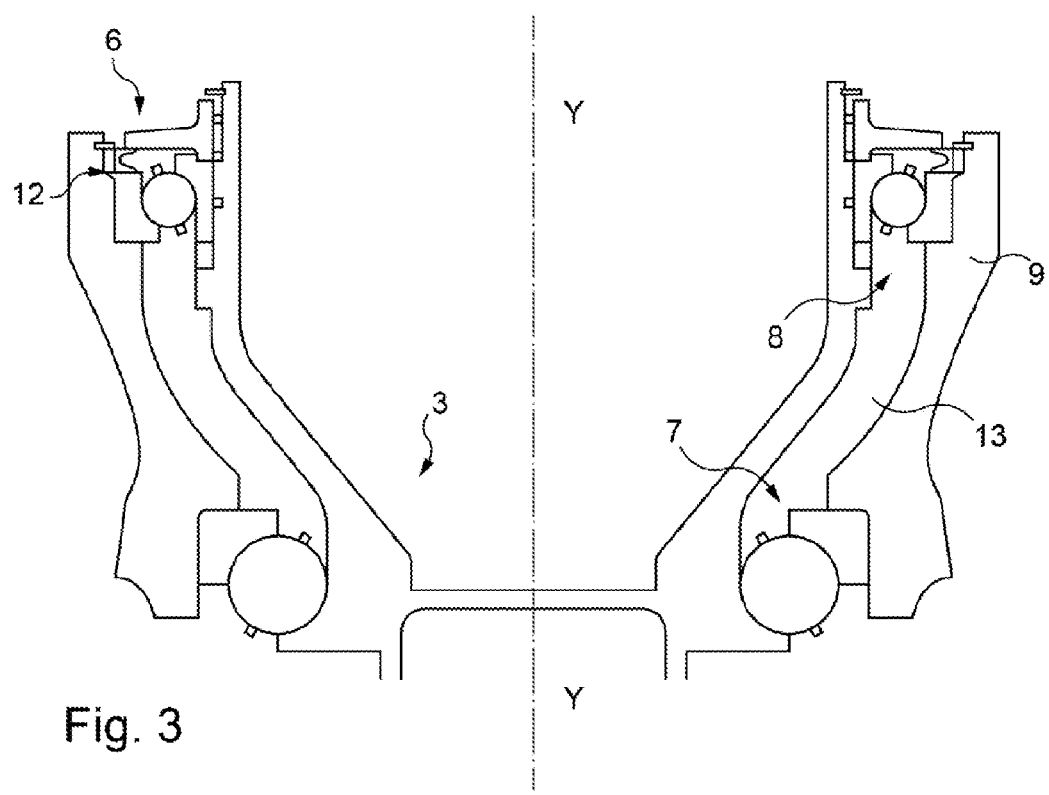
Figure 4:
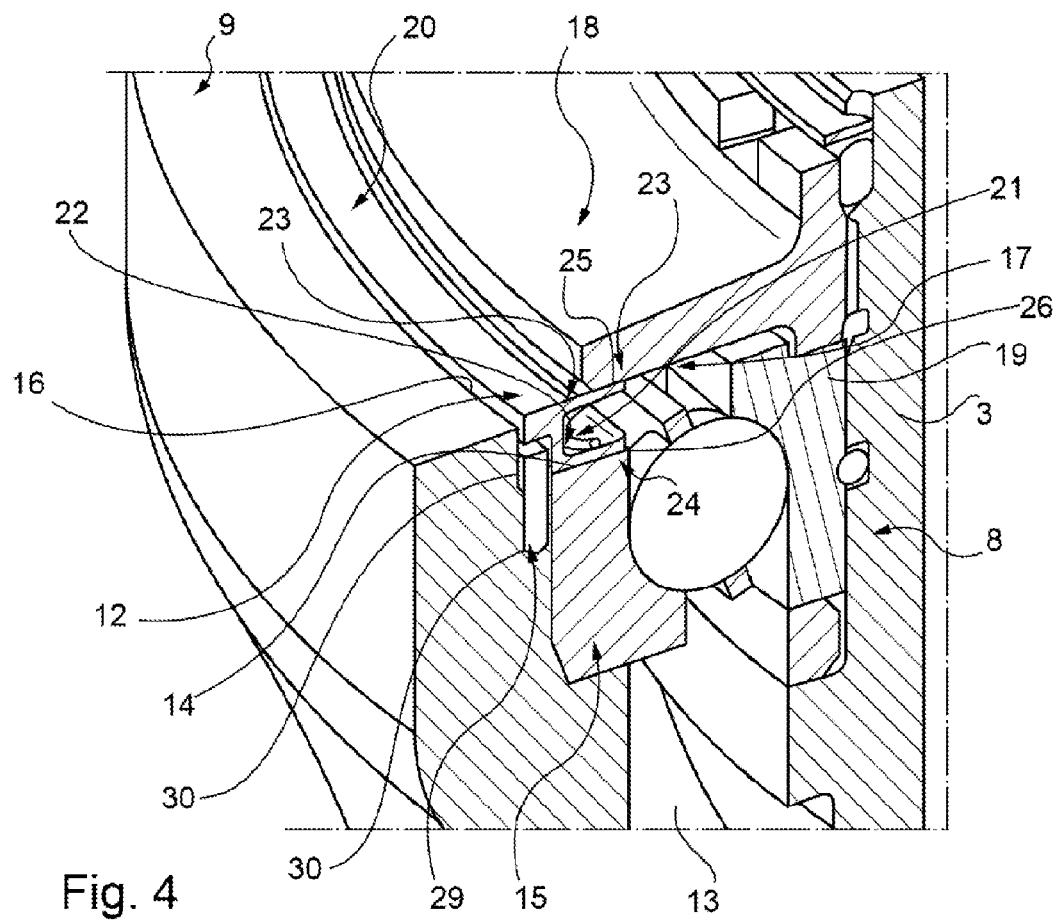
Figure 5:
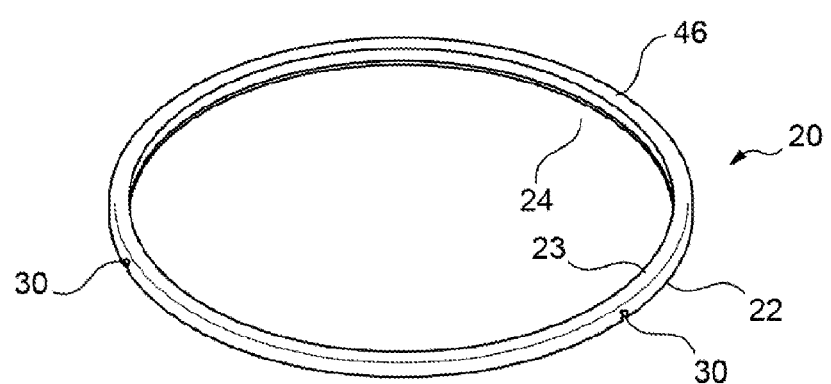
Figure 7:
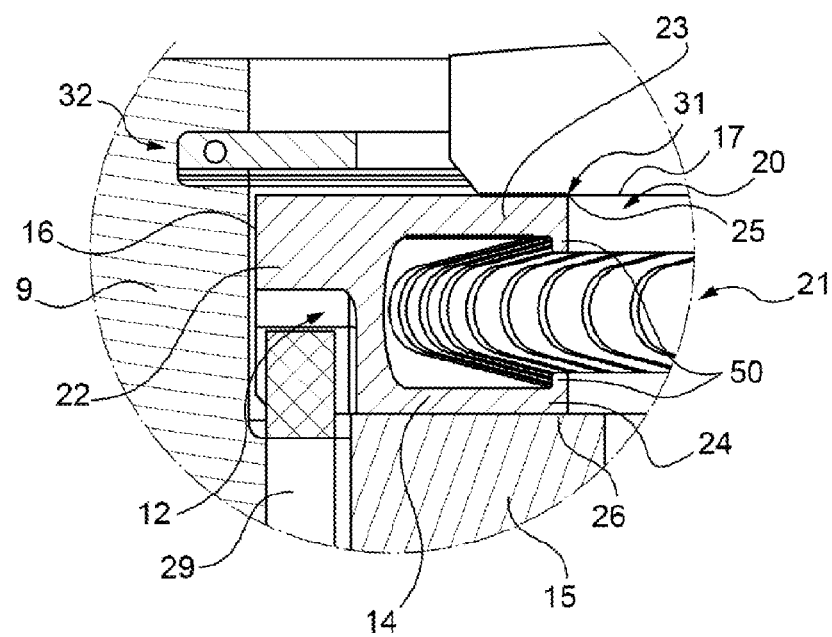
Figure 8:
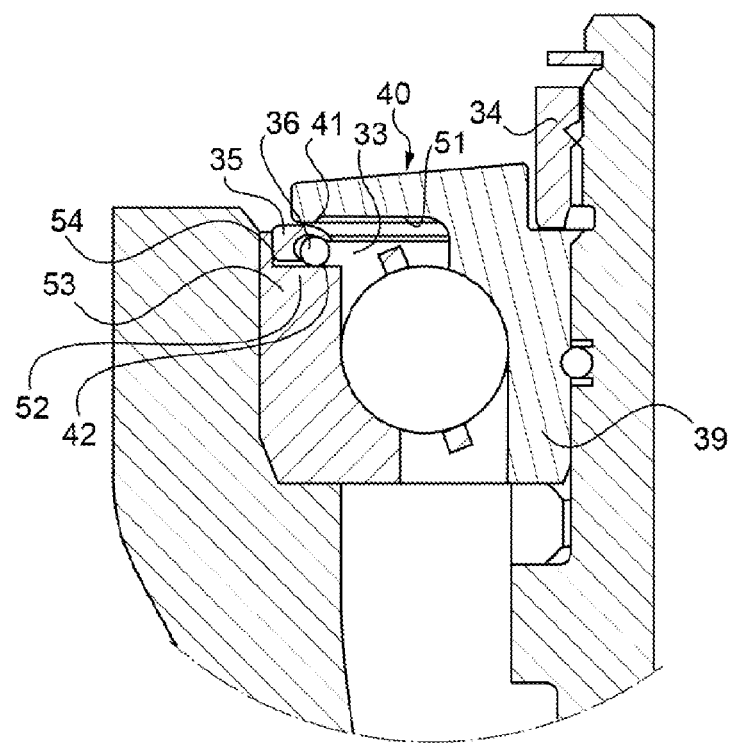
Figure 9:
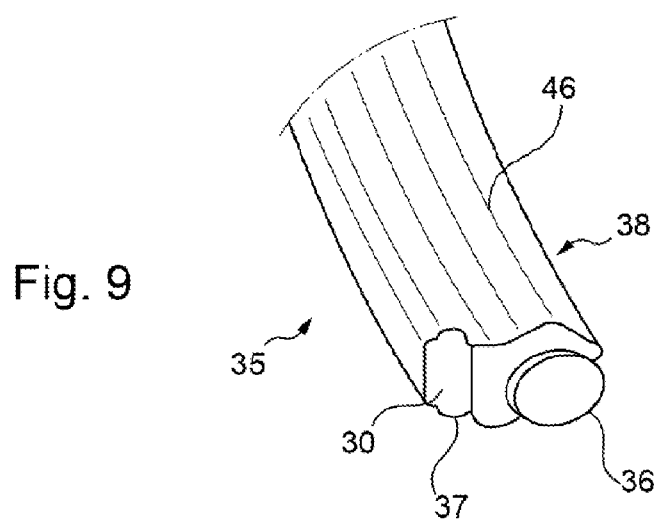

The invention will now be described in its different aspects, features and advantages by means of the following figures, which completely describe certain embodiments, not exclusive of others and therefore given for purely illustrative purposes:

FIG. 1: general view of a particular engine where the invention can be introduced;

FIG. 2: an enlarged detail of this figure;

FIG. 3: general view of the arrangement and neighbouring parts in radial cut;

FIG. 4: representation, in perspective with radial section, of a first embodiment of the arrangement;

FIG. 5: perspective view of the first sealing element;

FIG. 6A, FIG. 6B, FIG. 6C, FIG. 6D: four possible embodiments of the second sealing element;

FIG. 7: cross-sectional representation of the device, showing the cooperation between its two elements, as well as an alternative embodiment:

FIG. 8: another embodiment, in radial section;

FIG. 9: enlarged representation of the device of this second embodiment.

First, FIGS. 1 and 2 will be described. They partially represent a propeller rotor 1 of an aircraft engine, rotating around an axis of rotation X-X. The propeller comprises a circle of blades 2 distributed around the axis of rotation X-X, and each of the blades 2 comprises a root 3. The propeller rotor extends in front of a main body 4 of the engine, which may comprise a variable-pitch blade wheel 5 straightening the air flow, a combustion chamber and gas expansion turbines. According to FIG. 3, the root 3 is supported in a radial recess 6 of the propeller rotor 1 via two rolling bearings 7 and 8, the rolling bearing 7, closer to the axis of rotation X-X, being an inner rolling bearing, and rolling bearing 8 being an outer rolling bearing. The rolling bearings 7 and 8 have their outer ring which rests on a hub 9 of the propeller rotor 1, traversed by the radial recess 6. The blade 2 is pivotally guided by the rolling bearings 7 and 8, and rotates around their central axis, called "central axis Y-Y" hereinafter. The central axis Y-Y is not parallel to the axis of rotation X-X, but it intersects it here forming a right angle, and therefore it extends in a radial direction from the axis of rotation X-X. The blades 2 are subjected to significant forces in the direction of the root 3, in particular centrifugal forces when the propeller rotor 1 rotates, which explains why the rolling bearings 7 and 8 are here in oblique contact with their rolling elements, and therefore able to withstand these forces in the direction of the central axis Y-Y; but the invention could be applied to other types of rolling bearings, ball rolling bearings as here or other rolling elements. The rotations of the roots 3 and of all the pivoting blades 2 are controlled, for example, by a pitch adjustment mechanism known per se, with gears housed in the propeller rotor 1.

A sealing device 12 must be added to the radially outer side (according to the axis of rotation X-X) of the outer rolling bearing 8 to prevent both the flow of lubricant out of an annular cavity 13 containing the rolling bearings 7 and 8, as well as the entry of humidity or polluting particles into this cavity 13.

Figure 6A:
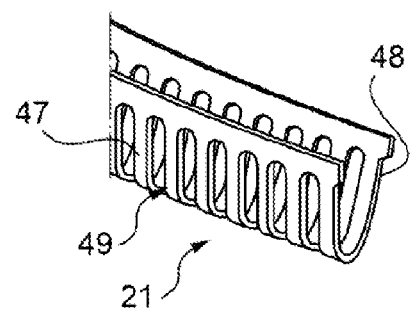
Figure 6B:
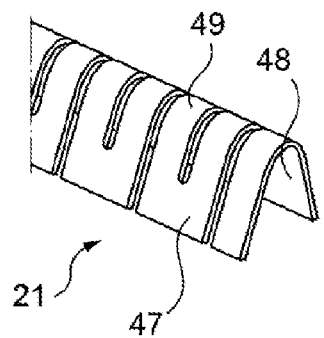
Figure 6C:
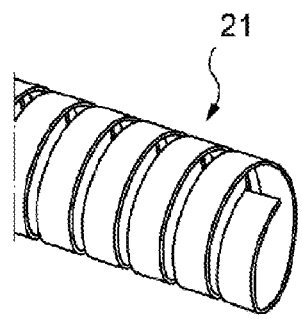
Figure 6D:
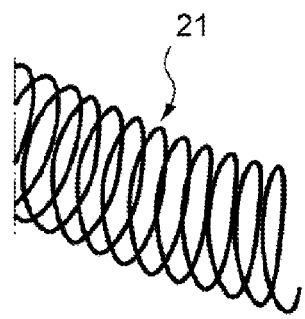

FIG. 4 better illustrates the sealing device 12. It rests on a planar bearing surface 14 on the radially outer side (according to the axis of rotation X-X) of an outer ring 15 of the outer rolling bearing 8, on a cylindrical face 16, forming part of the radial recess 6 and located at its radially outer end, and on a planar surface 17, directed radially inwards (according to the axis of rotation X-X), of a tightening nut 18 of an inner ring 19 of the outer rolling bearing 8. The sealing device 12 consists of a first element 20 and a second element 21 working in association. The planar bearing surface 14 and the planar surface 17 are both oriented in the direction of the central axis Y-Y, in opposite directions. The first element 20 (FIG. 5) is a ring-shaped seal closed along its periphery, made of a flexible material, made of polymer for example, also chosen to withstand the alternately hot and cold temperatures that the propeller rotor 1 undergoes. It is composed of an annular strip 22 facing the cylindrical face 16, a first lip 23 and a second lip 24. The first and second lips 23 and 24 are connected to the annular strip 22 by one end, extend in the same radial direction (inwards here) according to the central axis Y-Y and rest, by their ends opposite the connections, respectively on the planar surface 17 and on the planar bearing surface 14. The lips 23 and 24 can be essentially planar or conical, diverging from one another towards their free ends. The second element 21 is a resilient spring, the section of which can be U-shaped, V-shaped (FIGS. 6A and 6B) and composed of two diverging branches 47 and 48 forming an angle from a connection portion 49, or at closed circular, elliptical section (FIGS. 6C and 6D), or the like; and the section can be composed of turns or hoops joined successively to each other (FIGS. 6B and 6D) or by a connecting strip which unites them (FIGS. 6A and 6C).

Other constitutions of the spring are possible. The second sealing element 21 is retained in the first sealing element by flanges 50 directed towards each other at the end of the lips 23 and 24 (FIG. 7). The function of this second element 21 is to push back the first and second lips 23 and 24 axially (according to the central axis Y-Y) by pressing the branches 47 and 48 thereon by spreading them apart to maintain them on the planar bearing surface 14 and the planar surface 17. The first element 20 thus forms two circular sealing portions or lines, respectively 25 and 26, at the free ends of the lips 23 and 24. In addition, the compression of the second element 21 obtained during assembly can transmit to the annular strip 22 a force perpendicular to the central axis Y-Y, which presses it against the cylindrical face 16 belonging to the hub 9. The positions of the sealing lines 25 and 26 can be imposed by edges 46 protruding from the outer faces of the lips 23 and 24 (FIGS. 5 and 9). But the sealing device 12 is not in contact with the inner ring 19 of the outer rolling bearing 8, nor with the root 3, nor possibly with the hub 9, a clearance being able to separate the annular strip 22 from the cylindrical face 6.

The remarks that can be made on this arrangement are therefore as follows. The sealing device 12 is small and lightweight. It is therefore subject to lower centrifugal forces in service and easier to hold in place without special precautions. It can be housed entirely in an already existing space and delimited radially (according to the axis of rotation X-X) by the inner ring 19, in this embodiment where it projects from the other radially outwards. It is also easy to be installed, since it can be inserted while leaving a clearance, therefore without exerting a force, between the cylindrical face 16 and the inner ring 19. It does not require any additional part in this embodiment, where the tightening nut 18 is necessary to retain and load the outer rolling bearing 8. And the two sealing lines 25 and 26, which are circular closed and made on planar surfaces parallel to each other which are gradually moved towards each other by rotating the tightening nut 18, give a very reliable sealing. It will also be noted that the annular strip 22 can project from the hub 9 (in the direction of the central axis Y-Y).

It may be indicated, to extend the life of the seal, limited by friction, to make the first element 20 integral in rotation with the outer ring 15 and the hub 9. For this purpose, provision is made of pins 29, oriented parallel to the central axis Y-Y, in extending notches 30 located in the annular strip 22 and in the hub 9. In addition, the portion of the planar surface 17 which forms the first sealing line 25 can be provided with a wear layer 31, shown in FIG. 7. FIG. 7 illustrates yet another alternative embodiment. As most of the sealing device 12 faces an empty volume on the outer radial side, a retaining ring 32, mounted on the hub 9, can be added to at least partially cover the sealing device 12 in the outer radial direction if it is desired to avoid with complete safety any risk of tearing due to centrifugal forces, by then accepting a small elongation of the hub 9 towards the aerodynamic portion of the blade 2.

Another embodiment is described by means of FIG. 8. It differs from the previous one firstly in that the sealing device, now 33, and the tightening nut, now 34, have a different constitution. The sealing device 33 further includes (FIG. 9) a first sealing element 35 and a second sealing element 36, but the first is composed only of an annular strip 37 similar to the previous annular strip 22, and of a lip 38 similar to the previous first lip 23; and the second element 36 is a resilient O-ring seal. And the tightening nut 34 has a small width in the radial direction (according to the central axis Y-Y), so that it no longer extends above the sealing device 33. The inner ring, now 39, is then provided with a planar collar 40 which extends above the second element 36.

The functions of the sealing device 33 are the same as previously: the sealing is done on two parallel closed and circular lines 41 and 42, the first of which (41) is formed between the free end of the branch 38 and a lower surface 51 of the collar 40; but the second (42) is formed between the second sealing element 36 and a planar face 52 of the outer ring, now 53. These sealing lines 41 and 42 are still maintained by the compression of the second sealing element 36, the annular strip 37 here radially faces (according to the central axis Y-Y) an extension 54 of the outer ring 53 towards the radial outside (according to the axis of rotation X-X), but this extension 54, is an unimportant feature and could be absent.

In these embodiments, a pair of suitably chosen sealing elements forms two circular sealing portions or lines around the axis of the rolling bearing, one of these portions being present against a lateral face of one of the rings of the rolling bearing, and the other against one face of a part of the assembly which is associated with the other of the rings (or which is integral with this ring), and the sealing elements are compressed in the direction of the axis of the rolling bearing between said two faces, oriented in opposite directions in this direction.

As the sealing elements extend from one of the rolling bearing rings to a part integral with the other ring, they are sufficient to completely close the housing. No compression sealing in the direction perpendicular to the rolling bearing axis is necessary.

The sealing elements can be inserted in a free state into the housing before continuing the mounting of the mechanical assembly, and therefore without the mounting difficulties which could have been produced by friction to be overcome and resulting deformations of elements which are generally very flexible.

The cooperation between the two sealing elements allows to ensure sufficient sealing force, to maintain their correct position at the end of mounting, in particular avoiding their accidental extraction under the effect of centrifugal forces even if a large portion remains exposed to the outside of the housing, which can thus remain more widely open. A main function of the first element is more precisely to cover the housing in relation to the outside, and a main function of the second element to maintain the sealing force.

As the sealing elements can be small and light, the centrifugal forces exerted thereon will be of little importance. And keeping them in place can generally be ensured by parts already present in the arrangement for other reasons, and therefore without making it heavier.

Other embodiments of the invention obviously exist, without departing from the definition of the invention. The different details described here and distributed between the two main achievements could be associated with each other differently. The sealing device could also be disposed on the inner ring of the rolling bearing, instead of the outer ring 15, as has been described in these particular embodiments.

Suitable materials for the first element of the device could be PTFE with or without filler, PE-UHMW, PEEK, PP or other polymers; the second element could be metallic (Inconel, Hastalloy, etc.) in the first main embodiment described here; or made of VMQ, FVMQ., FKM, FFKM, or another elastomer compatible with the temperatures and fluids encountered in the second main embodiment.

The invention claimed is:

1. A mechanical assembly rotating around an axis of rotation (X-X) comprising a rolling bearing, two mounting parts for respectively mounting two rings of the rolling bearing (8), the mounting parts forming a housing receiving the rolling bearing, one of the rings of the rolling bearing rotating around a central axis (Y-Y) of the rolling bearing which intersects the axis of rotation (X-X), and a device for sealing the housing on a radially outer side according to the axis of rotation (X-X), wherein the sealing device comprises: a first sealing element comprising an annular strip and a first lip which is essentially planar or conical and connected to a portion of the annular strip, located on a radially outer portion of the annular strip according to the axis of rotation (X-X); a second sealing element adjacent to the annular strip and to the first lip, pressing the first lip radially outwards according to the axis of rotation (X-X), against a part associated with a second of the rings; and a sealing portion pressing on an end face of a first of the rings, the end face facing radially outwards according to the axis of rotation (X-X).

2. The mechanical assembly according to claim 1, wherein the first sealing element is a flexible seal made of polymer.

3. The mechanical assembly according to claim 2, wherein the annular strip of the first sealing element is separated from a wall of the housing, oriented in the direction of the central axis (Y-Y), by a clearance at least in a free state of the first sealing element.

4. The mechanical assembly according to claim 3, wherein the second sealing element is capable of exerting a deformation, oriented towards said wall of the housing, of said annular strip.

5. The mechanical assembly according to claim 1, wherein the second element is made of a resilient material.

6. The mechanical assembly according to claim 5, wherein the sealing portion is located on a second lip which is essentially planar or conical of the first sealing element, and the second sealing element has a spring effect.

7. A rolling arrangement according to claim 6, wherein the second sealing element comprises two branches pressing respectively on free ends, opposite the annular strip, of the first lip and the second lip, the branches forming an angle opening from the connecting portion.

8. The mechanical assembly according to claim 6, wherein the second sealing element has a closed, circular or elliptical section.

9. The mechanical assembly according to claim 5, wherein the sealing portion belongs to the second sealing element, which is a resilient seal with a deformable section.

10. The mechanical assembly according to claim 1, wherein the first of the rings is an outer ring, according to the central axis (Y-Y), of the rolling bearing.

11. The mechanical assembly according to claim 1, wherein the first of the rings is offset radially inwards, according to the axis of rotation (X-X), relative to the second rings, and wherein the part associated with the second of the rings is a collar, made integrally with the second of the rings.

12. The mechanical assembly according to claim 1, wherein the first of the rings is offset radially inwards, according to the axis of rotation (X-X), relative to the second rings, and wherein the part associated with the second of the rings is a nut for tightening the second of the rings on a second of the mounting parts.

13. The mechanical assembly according to claim 1, wherein the first of the mounting parts comprises a retaining ring covering the annular strip, radially outwards according to the axis of rotation (X-X).

14. The mechanical assembly according to claim 1, characterised in that wherein the part associated with the second of the rings comprises a wear track in contact with the first lip.

15. The mechanical assembly according to claim 1, wherein the mechanical assembly is a propeller rotor with variable-pitch blades, one of the rolling bearing rings is mounted on a root, pivoting in the rotor, of one of the blades, the other of the rings is mounted in a hub of the rotor.

* * * * *